(12) United States Patent
Ericson et al.

(10) Patent No.: US 6,256,841 B1
(45) Date of Patent: Jul. 10, 2001

(54) WEDGE CLAMP TYPE TERMINATION FOR ELEVATOR TENSION MEMBER

(75) Inventors: Richard J. Ericson, Southington; Dennis J. Rehmer, Bristol; Pedro S. Baranda, Farmington, all of CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/224,045

(22) Filed: Dec. 31, 1998

(51) Int. Cl.[7] ...................................................... F16G 11/04
(52) U.S. Cl. ............................................................... 24/136 R
(58) Field of Search ...................................... 187/411, 412, 187/349, 414, 251, 254, 266, 264, 404, 350, 373; 24/136 R, 115 M, 136 L, 136 K; 403/211, 314, 374.1; 188/188

(56) References Cited

U.S. PATENT DOCUMENTS

| | | |
|---|---|---|
| 975,790 * | 11/1910 | Pearson . |
| 1,011,423 * | 12/1911 | Gale, Sr. . |
| 1,035,230 * | 8/1912 | Pearson . |
| 1,164,115 * | 12/1915 | Pearson . |
| 1,266,312 | 5/1918 | Pope . |
| 1,380,800 | 6/1921 | Haworth . |
| 2,827,680 | 3/1958 | Gibson . |
| 3,148,427 * | 9/1964 | Hoffstrom . |
| 4,570,753 | 2/1986 | Ohta et al. . |
| 4,624,097 | 11/1986 | Wilcox . |
| 4,643,609 | 2/1987 | Biass . |
| 4,887,422 | 12/1989 | Klees et al. . |
| 5,112,933 * | 5/1992 | O'Donnell et al. . |
| 5,199,137 | 4/1993 | Edwards . |
| 5,336,846 | 8/1994 | Sachs . |
| 5,353,893 | 10/1994 | Sun et al. . |
| 5,526,552 | 6/1996 | De Angelis . |
| 5,553,360 | 9/1996 | Lucas et al. . |
| 5,566,786 | 10/1996 | De Angelis et al. . |
| 5,855,254 | 1/1999 | Blochle . |
| 5,881,843 | 3/1999 | O'Donnell et al. . |
| 6,058,575 | 5/2000 | Dagan . |
| 6,061,879 | 5/2000 | Ericson et al. . |

FOREIGN PATENT DOCUMENTS

| | | |
|---|---|---|
| 2333120 * | 1/1975 | (DE) . |
| 3623407 | 7/1986 | (DE) . |
| 2293392 | 12/1974 | (FR) . |
| 1362514 * | 8/1974 | (GB) . |
| 1 401 197 | 7/1975 | (GB) . |
| 63-092412 | 4/1988 | (JP) . |
| 01137383 | 6/1989 | (JP) . |
| 1-242385 | 9/1989 | (JP) . |
| 03192398 | 8/1991 | (JP) . |
| 3-229042 | 10/1991 | (JP) . |
| 5-39180 | 2/1993 | (JP) . |
| 5-70059 | 3/1993 | (JP) . |
| 7-71537 | 3/1995 | (JP) . |
| 1216120A * | 7/1986 | (SU) . |
| WO98/29326 | 7/1998 | (WO) . |
| WO98/29327 | 7/1998 | (WO) . |

OTHER PUBLICATIONS

Hanover Fair 1998.

* cited by examiner

Primary Examiner—James R. Brittain

(57) ABSTRACT

A tension member termination device optimized for terminating flat tension members having compressible outer coatings, the device including a wedge and a socket each having cooperating surfaces positioned at a predetermined angle for clamping the tension member therebetween. The angle reliably secures the tension member while avoiding deleterious pressure and stress upon the tension member. The invention also provides a safety clamp for optional use with the tension member termination device.

20 Claims, 4 Drawing Sheets

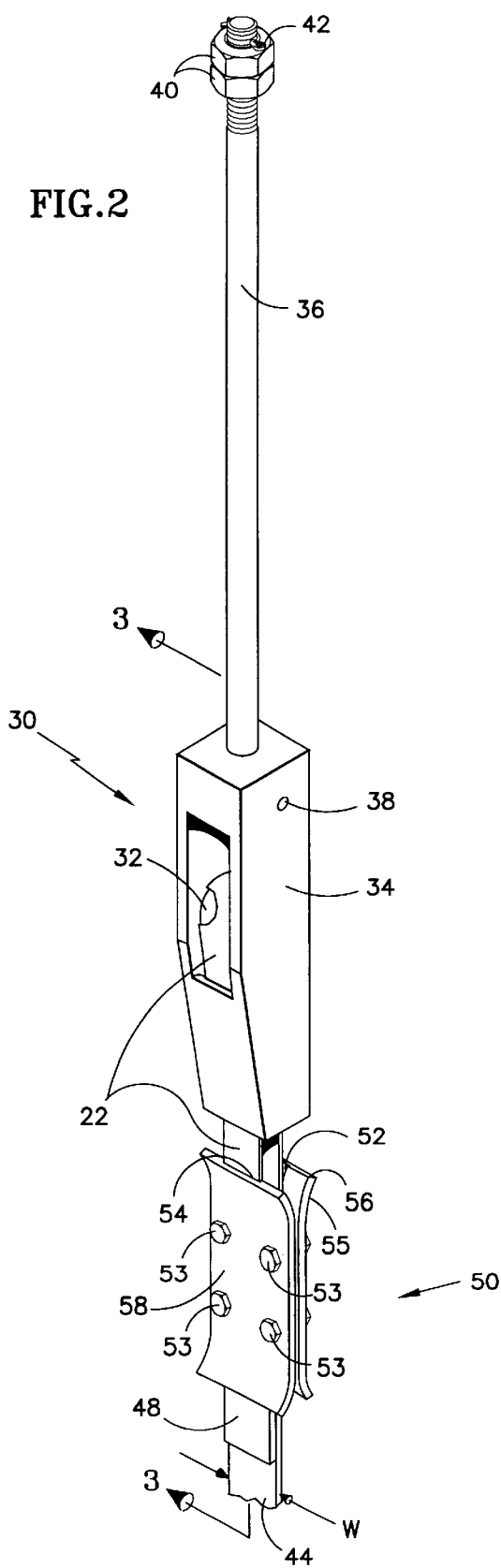
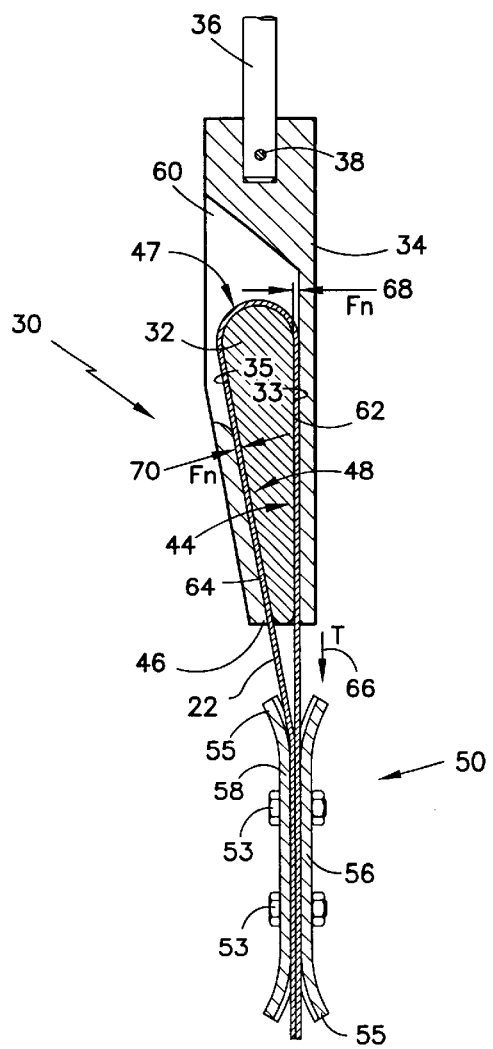
FIG. 2
FIG. 3

WEDGE CLAMP TYPE TERMINATION FOR ELEVATOR TENSION MEMBER

TECHNICAL FIELD

The present invention relates to elevator systems, and more particularly to tension members for such elevator systems.

BACKGROUND OF THE INVENTION

A conventional traction elevator system includes a car, a counterweight, two or more ropes interconnecting the car and counterweight, a traction sheave to move the ropes, and a machine to rotate the traction sheave. The ropes are formed from laid or twisted steel wire and the sheave is formed from cast iron.

Although conventional steel ropes and cast iron sheaves have proven very reliable and cost effective, there are limitations on their use. One such limitation is the traction forces between the ropes and the sheave. Typical techniques to increase the traction forces between the ropes and sheave result in reducing the durability of the ropes, increasing wear or the increasing rope pressure.

Another limitation on the use of steel ropes is the flexibility and fatigue characteristics of steel wire ropes. The minimum diameter of a steel rope is dictated mostly by fatigue requirements and results in a relatively thick rope. The relatively thick cross section of a steel rope reduces its inherent flexibility necessitating a sheave having a relatively large diameter. The larger the sheave diameter, the greater torque required from the machine to drive the elevator system thereby increasing the size and cost of the elevator system.

Another drawback of conventional round ropes is that smaller sheave diameters increase rope pressure shortening the life of the rope. Rope pressure is generated as the rope travels over the sheave and is directly proportional to the tension in the rope and inversely proportional to the sheave diameter D and the rope diameter. In addition, the shape of the sheave grooves, including such traction enhancing techniques as undercutting the sheave grooves, further increases the maximum rope pressure to which the rope is subjected.

In a typical rope driven elevator installation rope wedge clamps are used for termination purposes. Wedge clamps operate by securing the elevator rope between opposed angled walls of the wedge clamps and a tear drop shaped wedge around which the cable is wound. The wedge acts to cam the rope against the walls of the wedge clamp during tensioning of the ropes. A benefit of this design is that the wedge may have a relatively sharp angle producing a large clamping force. Because the steel ropes have a high compressive strength the large clamping force has no deleterious effects on the rope such as crush or creep.

In attempts to overcome the deficiencies and drawbacks of conventional round steel ropes for use in elevator systems coated tension members, including a relatively flat tension member, has been developed. The flat tension member includes a plurality of individual load carrying cords encased within a common layer of coating. An exemplary tension member of the type contemplated in this application is discussed in further detail in U.S. Ser. No. 09/031,108 filed Feb. 26, 1998 Entitled Tension Member For An Elevator and Continuation-In-Part Application Entitled Tension Member For An Elevator filed Dec. 22, 1998 under Attorney Docket No. 98-2143, both of which are entirely incorporated herein by reference.

The coating layer surrounds and/or separates the individual cords and defines an engagement surface for engaging a traction sheave. As a result of the configuration of the tension member, the rope pressure may be distributed more uniformly throughout the tension member, traction is increased and smaller sheave diameters are possible.

A method of terminating and securing flat tension members involves looping the members over a bar and clamping the end with a pair of plates. The plates are secured by a plurality of fasteners that pass through holes provided in the plates. Another method of terminating flat tension members includes a wedged end fastener wherein a wedge of material is positioned at the end of the tension member and clamped by a pair of plates. In such a configuration one of the plates comprises a wedge shaped cross section cooperating with the wedge of material and the second plate comprises a cross section of uniform thickness. The plates are similarly secured by a plurality of fasteners that pass through holes provided in the plates. A drawback to these types of termination methods is that the tension carrying capability of the termination relies solely on the clamping forces provided by the fasteners. In addition, the wedge type fastener limits the termination point of the member and hampers adjustability.

The above art notwithstanding, scientists and engineers under the direction of Applicants' Assignee are working to develop more efficient and durable methods and apparatus to drive elevator systems.

DISCLOSURE OF THE INVENTION

According to the present invention, a termination device for a tension member having a compressible outer coating has a wedge disposed in a socket having cooperating jaw surfaces. The rope is wrapped around the wedge and inserted with the socket and clamped therein by forces generated by the tension in the member and the cooperation of the wedge and jaw surfaces.

A principal feature of the present invention is the geometry of the wedge, particularly the angle of the wedge, including its length and width. The wedge is sized and the angle is selected to provide sufficient clamping force to resist slippage of the rope without exceeding the compressive stress capability of the tension member. In addition, the wedge comprises a domed top portion to efficiently distribute the tension of the rope across the wedge.

BRIEF DESCRIPTION OF THE DRAWINGS

FIG. 2 is a perspective view of an embodiment of a termination clamp, showing an optional tension clamp device;

FIG. 3 is a cross sectional view of the embodiment shown in FIG. 2 taken substantially,along lines 3—3;

BEST MODE FOR CARRYING OUT THE INVENTION

Figure 1:
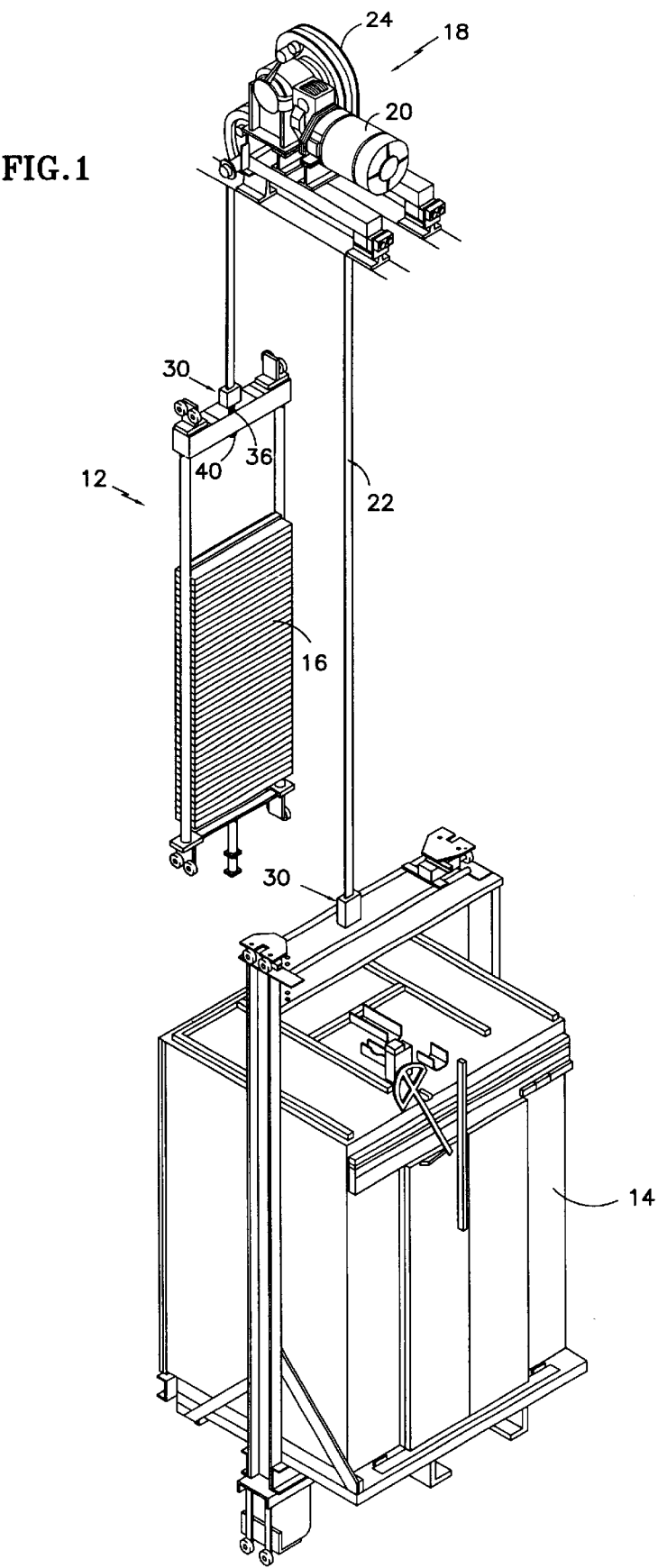
FIG. 1 is perspective, view of an elevator system having a tension member termination device according to the present invention.

Illustrated in FIG. 1 is a traction elevator system 12. The elevator system 12 includes a car 14, a counterweight 16, a traction drive 18, and a machine 20. The traction drive 18 includes a tension member 22, interconnecting the car 14 and counterweight 16, and a traction sheave 24. The tension member 22 is engaged with the sheave 24 such that rotation of the sheave 24 moves the tension member 22, and thereby the car 14 and counterweight 16. Tension member 22 is coupled to counterweight 16 and car 14 by terminal clamp 30. Although shown as a geared machine 20, it should be noted that this configuration is for illustrative purposes only, and the present invention may be used with geared or gearless machines. In addition, although shown as a relatively flat tension member 22, it should be noted that this too is by way of example and the present invention may be used with other types of tension members including round coated tension members.

An embodiment of terminal clamp 30 is illustrated in more detail in FIG. 2. Tension member 22 is wrapped around wedge 32 and disposed within socket 34. Terminal clamp 30 is attached to car 14 and counterweight 16 via attachment rod 36 attached to socket 34 by pin 38. Attachment rod 36 is coupled to counterweight 16 and car 14 by threaded nuts 40 secured in place by cotter pin 42. Also shown in FIG. 2 is an optional gripping jaw clamp 50 wherein tension member 22 is clamped within grooves 52, 54 of plates 56, 58 in a double overlap arrangement.

Referring to FIG. 3 clamp 30 operates to provide a secure termination of tension member 22. In use, lead portion 44 of tension member 22 is inserted within aperture 46 in the bottom portion of socket 34, as viewed in the figure, wrap portion 47 of the tension member is then wrapped around wedge 32 and then tail portion 48 passed back out through aperture 46. Wedge 32 is then inserted within opening 60 of socket 34 to the clamp position shown in FIG. 2 wherein lead portion 44 and tail portion 48 are clamped between jaw surfaces 62, 64 respectively, of socket 34. Termination clamp 30 is designed such that tension member 22 and attachment rod 36 are substantially axially aligned to allow for efficient load transfer and prevents undesirable rotation of termination clamp.

Still referring to FIG. 3, in normal operation of the elevator system 12 (FIG. 1), the tension (T) in lead portion 44 of tension member 22 is in the direction indicated by arrow 66 which reacts in wrap portion 47 to force wedge 32 farther into socket 34 in the direction of aperture 46. With the load in tension member 22 forcing wedge 32 into socket 34, a clamping force represented by arrow 68 clamps lead portion 44 against jaw surface 62 and a clamping force represented by arrow 70 clamps tail portion 48 against jaw surface 64. Clamping forces 68, 70 are normal to jaws 62, 64 respectively, and to the respective portions of wedge 32 and are expressed as normal forces ($F_n$). The clamping forces generated by jaws 62, 64, together with the friction forces acting on wrap portion 47, react out the total tension (T) in tension member 22 thereby retaining the member in clamp 30.

Figure 4:
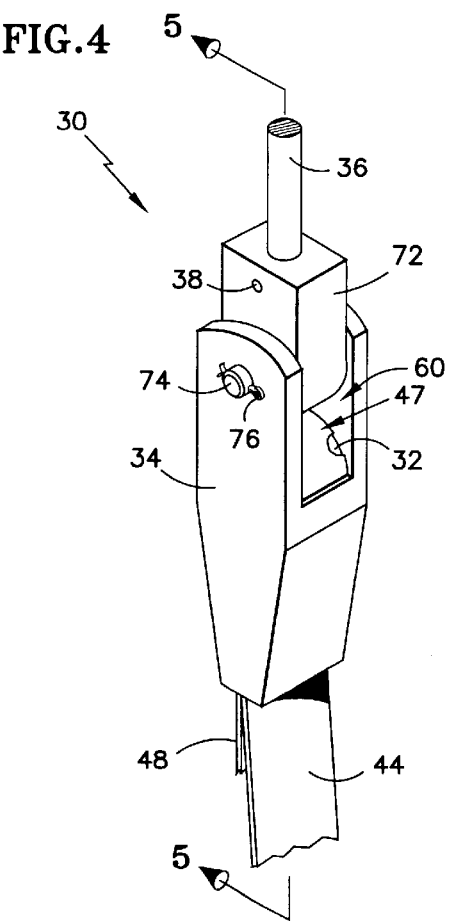
FIG. 4 is perspective view of an alternate embodiment showing a pivot block.
Figure 5:
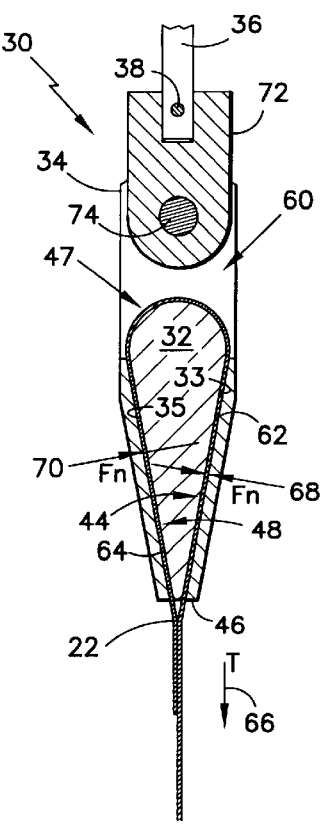
FIG. 5 is a cross sectional view, of the embodiment shown in FIG. 4 taken substantially along lines 5—5.

An alternative embodiment of termination clamp 30 is shown in FIGS. 4 and 5 wherein attachment rod 36 is attached to pivot block 72 by pin 38 an in turn pivotally attached to socket 34 by pivot pin 74 and secured by cotter pin 76. In this particular embodiment, lead portion 44 of tension member 22 is inserted within aperture 46 in the bottom portion of socket 34, as viewed in the figure, wrap portion 47 of the tension member is then wrapped around wedge 32 and then tail portion 48 passed back out through aperture 44. Wedge 32 is then inserted within opening 60 of socket 34 to the clamp position shown in FIG. 5 wherein lead portion 44 and tail portion 48 are clamped between jaw surfaces 62, 64 respectively, of socket 34. It is an important feature of this embodiment that once wedge 32 and tension member 22 are installed within socket 34 pivot block 72 is then installed to prevent the wedge from being inadvertently dislodged from the socket if tension is lost in the member, as will be more fully described hereinbelow. In addition, this particular embodiment maintains tension member 22 and attachment rod 36 substantially axially aligned to allow for efficient load transfer. Pivot block 72 also permits angular displacement of tension member 22 relative to the car 14 or counterweight 16 without imparting large stresses within attachment rod 36 or socket 34. Another advantage of this particular embodiment over that shown in FIGS. 2 and 3 is that the overall height the socket is reduced because the wedge 32 is inserted through the top of socket 34. Pivot block 72 is then inserted within close proximity of the wedge thus reducing the overall height of termination clamp 30.

The geometry of wedge 32 is an important factor in producing normal forces 68, 70 and properly retaining tension member 22. The relevant parameters of wedge 32 controlling the normal force $F_n$ are shown with reference to FIG. 6 and include the length (L) designated by 78, depth (d) represented by 80, angle φ represented by 82 and measured from centerline 83 to clamping surface 33, 35 and the width (W) of tension member 22 (FIG. 2). The other factor relevant to controlling the normal forces 68, 70 is the tension (T) in tension member 22 represented by 66. The parameters L and d are somewhat dependant on φ and are typically limited by available space in the hoistway (not shown). Given a nominal tension T, normal forces $F_n$ 68, 70 (FIGS. 3 and 5) are inversely related to φ. That is to say, if φ is too small, $F_n$ will be too great and tension member 22 will experience compressive creep. This is particularly important in an embodiment where tension member 22 is comprised of a urethane outer coating, or where the coating is another flexible elastomer, as they have a maximum compressive stress (σc) capability of about 5 MPa before non-recoverable deformation, or creep, occurs. On the other hand if φ is too large the normal forces will be too small the tension member will slip within termination clamp 30. It is particularly advantageous to reduce the compressive stress on tension member 22. One way to reduce the compressive stress is to increase the length L over which the clamping forces are applied, however hoistway consideration are generally limiting in this regard. Taking the above referenced physical parameters in to consideration, in order to preclude exceeding $σ_c$ the minimum φ can be predetermined in accordance with the formula:

$$\phi = \tan^{-1}[T/(\sigma_c * L * W)]$$

In a typical application of the present invention for a tension member having a T of about 2500 N, d ranges from about 60 mm to about 70 mm, L is about 140 mm, φ ranges from about 9 degrees to about 10 degrees.

Figure 6:
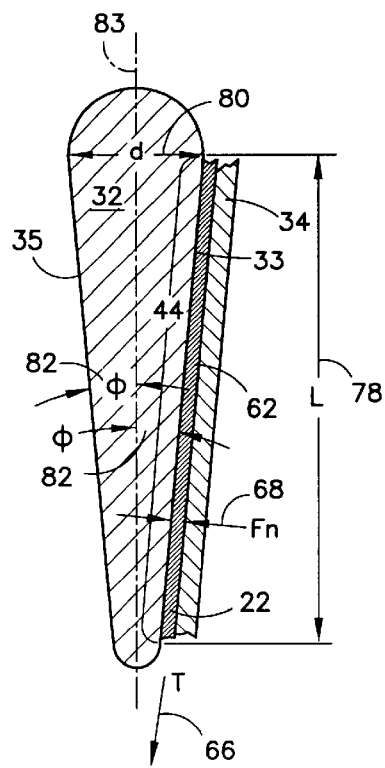
FIG. 6 is diagramnatic cross sectional view of a wedge, tension member and jaw surface showing the relevant geometries and forces.

The present invention will now be described with respect to a specific example of the termination clamp 30 shown in FIGS. 4 and 5 by referring to FIG. 6. A typical tension member 22, as described in the above related applications, is comprised of a 30 mm wide flat flexible rope having a urethane outer coating and has a maximum tension capability of 30,000 N. As is known in the art, a safety factor of about 12 is applied to elevator ropes and provides a maximum tension in member 22 of about 2500 N. Wedge 32 has length L of 140 mm and angle φ of 10 degrees geometrically yielding diameter d as follows:

$$d=2(L \tan \phi)=2(140 \tan 20/2))=49.37 \text{ mm}$$

The determination of $F_n$ with T equal to 2500 N is as follows:

$$F_n=T/\sin=\phi 2500/\sin(20/2)=14,397 \text{ N}$$

Since $F_n$ is distributed over the entire area of lead portion 44 the compressive stress on the tension member 22 is a function of the area of lead portion, A, clamped between wedge 32 and jaw surface 62, and is calculated as follows:

$$A=L*W=140*30=4,200 \text{ mm}^2$$

The compressive stress in tension member 22 is then determined as follows:

$$\sigma=F_n/A=14,397/4,200=3.43 \text{ Mpa}$$

In this particular example, the compressive stress limit of the material is not exceeded and therefore no creep will occur.

The ability of termination clamp 30 to react out T in lead section 44 is important and is a function of $F_n$ and the coefficient of friction (μ) between the tension member 22 and jaw surface 62 and the surface of wedge 32. In the example given, tension member 22 is comprised of a urethane coating and jaw surface 62, as well as wedge 32, is smooth steel and a conservative number for the coefficient friction between the surfaces is about μ=0.25. To properly maintain wedge 32 within socket 34 T must be preferably substantially reacted out within lead section 44 although a remainder may be transferred into wrap section 47. The following relation, from clamping theory, provides the maximum reaction force $F_r$, or the amount of tension that can be reacted, in the example given for μ=0.25:

$$F_r=\mu*F_n=0.25*14,397=3,599 \text{ N}$$

Therefore, recalling that the maximum T in the example given is 2500 N, all of the tension T will be reacted out of tension member 22 in the lead portion 44 and the member will not slip within termination clamp 30.

An alternative embodiment of the present invention aimed at increasing the coefficient of friction between the tension member 22 and the jaw surface 62, 64 and wedge 32 comprises a roughened surface on the jaws and the wedge. In one particular embodiment the surface is roughened by a sandblasting procedure. Sandblasting of the surfaces raises the coefficient of friction to 0.35 or greater. Other methods of increasing the surface friction include etching, machining, knurling and other suitable equivalents. In addition to raising the coefficient of friction the roughened surfaces would form small ridges and valleys. A characteristic of the urethane coating is its tendency to exhibit cold flow under high loading conditions. Under the loading conditions described above the urethane coating cold flows into and around the ridges and valleys, also referred to as locking features, in the wedge and socket and provides for a small but effective mechanical lock. The locking features increase the ability of the termination clamp to resist slippage of tension member 22. It is within the scope of the present invention that the locking features may comprise grooves, striations 83 (FIG. 7), cuts, diamond pattern, or other suitable equivalents. It is important to note that the locking features reduce the required normal force as described hereinabove. The use of locking features as describes allows a reduction in the length L, or an increase in angle φ to further minimize the risk of creep.

Figure 7:
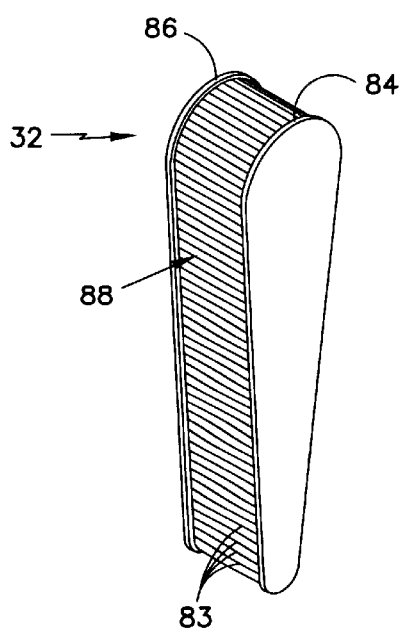
FIG. 7 is a perspective view of an embodiment of a wedge showing ridges and locking features.

An alternative embodiment for wedge 32 is shown in FIG. 7 and includes ridges 84, 86 forming a channel 88 therebetween. Ridges 84, 86 are approximately the height of a cord within the coating of tension member 22. For example, a particular embodiment of tension member 22 is 3 mm thick having a cord with a 1.4 mm cord disposed therein. Ridges 84, 86 for this particular embodiment would define a channel 88 having a depth of approximately 1 mm. Tension member 22 is disposed within channel 88 and wedge 32 is installed within socket 34 as described herein above. The benefit of ridges 84, 86 are that they contain tension member 22 within channel 88 given the anticipated cold flow characteristics of the coating material. In addition, ridges 84, 86 are sized to prevent compressive stress failure of tension member 22 by limiting the displacement of wedge 32 within socket 34. In the event that a higher than anticipated normal force $F_n$ is transferred to the member ridges 84, 86 will contact jaw surfaces 62, 64 and arrest the travel of wedge 32 within socket 34.

Figure 8:
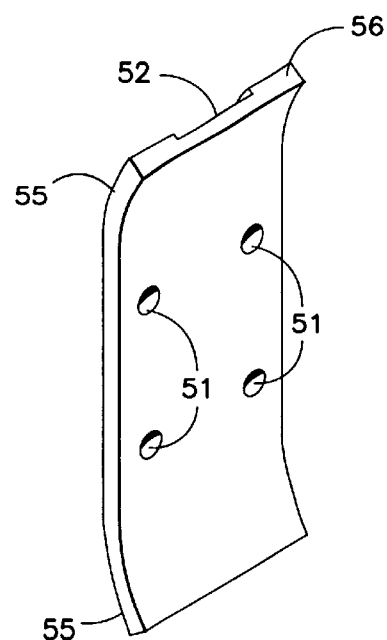
FIG. 8 is a perspective view of a plate of the tension clamp of FIG. 2.
Figure 9:
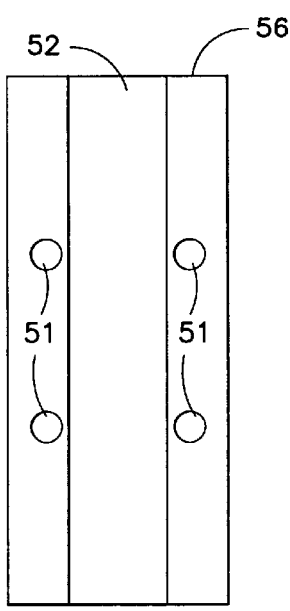
FIG. 9 is a front plan view of a plate of the tension clamp of FIG. 8.

Referring now to FIGS. 2, 8 and 9, the above mentioned optional tension clamp 50 for use with the termination clamp 30 is illustrated. The purpose of tension clamp 50 is to aid in terminating and reacting tension in member 22 and to equalize the tension between lead portion 44 and tail portion 48 as they enter socket 34. Tension clamp 50 also assists termination clamp 30 in the unlikely event of that tension member 22 loses tension, such as for instance, during an abrupt stop of elevator car 14. Tension clamp 50 is clamped onto the tail portion 48 and lead portion 44 prior to entering socket 34. When engaged with the tension member 22, tension clamp 50 cannot move thereon. Plates 56, 58 as shown and described are identical, however it is within the scope of the present invention that the plates are different wherein one plate has a tension member groove and one plate has no groove.

As described hereinabove tension clamp 50 comprises a pair of plates 56, 58 each having a tension member groove 52, 54 approximately the thickness of the tension member 22. Bore holes 51 are provided for through passage of fasteners 53. Plates 56, 58 further include leading edges 55 comprising a generous radius to facilitate a smooth transition of lead portion 44 and tail portion 48 from socket 34 into tension clamp 50.

In use, the lead portion 44 is inserted into groove 52 of plate 56 and tail portion 48 into groove 54 of plate 58 and the plates are assembled together with fasteners 53. When the bolts 53 are tightened tension member 22 is clamped within the grooves 52, 54 and are held resistant to slippage by plates 56, 58. In this way the tension member is prevented from moving relative to tension clamp 50.

When optional tension clamp 50 is used in conjunction with termination clamp 30, leading portion 44 and tail portion 48 load share the full tension created by car 14. In this regard, the analysis for determining the clamping performance established herein above is modified to reflect a load sharing in the tension in each of the cables.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A termination device for a tension member having an elastomer coating, the termination device comprising:

a socket having at least one jaw surface; and a wedge having a centerline and at least one clamping surface positioned at a predetermined angle from the centerline, the wedge disposed within the socket with the at least one clamping surface juxtaposed to the jaw surface, wherein the predetermined angle is selected such that the normal force produces a stress less than the maximum compressive stress capability of the elastomer coating.

2. The termination device as set forth in claim 1 wherein the tension member is disposed between the clamping surface and the jaw surface.

3. The termination device as set forth in claim 2 wherein the tension member includes a tensile force providing a normal force between the clamping surface and the jaw surface clamping the tension member therebetween.

4. The termination device as set forth in claim 3 wherein the tensile force is T, the predetermined angle is $\phi$, and the normal force is $F_n$ and is provided in accordance with the formula: $F_n = T/\tan \phi$.

5. The termination device as set forth in claim 4 wherein the clamping surface includes a length, L, the tension member has a width, W, and includes a maximum compressive stress capability for the elastomer coating, $\sigma_c$, and wherein the minimum predetermined angle is determined in accordance with the formula:

$$\phi = \tan^{-1}(T/(\sigma_c * L * W)).$$

6. The termination device as set forth in claim 5 wherein the tension member is comprised of a inner load carrying member comprised of a first material and an outer portion comprised of a second material, wherein the outer portion defines a traction surface for the tension member, and wherein the normal force produces a stress less than the maximum compressive stress capability of the outer portion.

7. The termination device as set forth in claim 6 wherein the compressive stress capability of the outer material limits L and $\phi$.

8. The termination device as set forth in claim 7 maximum compressive stress capability of the outer material is from about 2.5 MPa to about 5 MPa.

9. The termination device as set force claim 5 wherein the predetermined angle ranges from about 9 degrees to about 10 degrees and the length is about 140 mm.

10. The termination device as set forth in claim 3 wherein the tension member comprises a substantially rectangular cross section having a lead portion, a wrap portion and a tail portion, the at least one jaw surface comprises a first jaw surface and a second jaw surface, the at least one clamping surface comprises a first clamping surface and a second clamping surface positioned on either side of a plane passing through the centerline, the wedge further comprises a wrap section comprising a semi-circular shape disposed substantially tangentially between the first clamping surface and the second clamping surface, and wherein the lead portion is disposed between the first clamping surface and the first jaw surface, the wrap portion is disposed on the wrap section and the tail portion is disposed between the second clamping surface and the second jaw surface.

11. The termination device as set forth in claim 10 wherein the semi-circular shape has a diameter ranging from about 60 mm to about 70 mm.

12. The termination device as set forth in claim 10 wherein the socket has an aperture and an opening further and wherein the lead portion and the tail portion extend through the aperture and the wedge is disposed within the opening.

13. The termination device as set forth in claim 12 further comprising a connecting rod attached to the socket in axial alignment with the aperture.

14. The termination device as set forth in claim 13 further comprising a pivot block pivotally connected to the socket and wherein the connecting rod is attached to the pivot block.

15. The termination device as set forth in claim 10 wherein the wedge comprises a pair of ridges positioned orthogonally at each edge of the first and second clamping surfaces defining a channel therebetween receiving the tension member and contacting the jaw surface and limiting the normal force thereof.

16. A termination device as set forth in claim 3 wherein at least one of the clamping surface and the jaw surface includes locking features to mechanically lock the tension member therein.

17. The termination device as set forth in claim 1 wherein the tension member comprises a substantially round cross sectional shape or a substantially rectangular cross sectional shape.

18. A termination device as set forth in claim 1 wherein at least one of the clamping surface and the jaw surface is textured to increase the coefficient of friction thereof.

19. A termination device as set forth in claim 18 wherein the tension member comprises a substantially rectangular cross section having a lead portion, a wrap portion and a tail portion, the at least one jaw surface comprises a first jaw surface and a second jaw surface, the at least one clamping surface comprises a first clamping surface and a second clamping surface positioned on either side of a plane passing through the centerline, the wedge further comprises a wrap section comprising a semi-circular shape disposed substantially tangentially between the first clamping surface and the second clamping surface, and wherein the lead portion is disposed between the first clamping surface and the first jaw surface, the wrap portion is disposed on the wrap section and the tail portion is disposed between the second clamping surface and the second jaw surface.

20. A wedge and socket termination device for a tension member having an elastomer coating, the wedge having a clamping surface includes a length, L, and an angle $\phi$, the tension member having a tensile force, T, a width, W, and wherein the elastomer coating includes a maximum compressive stress capability, $\sigma_c$, and wherein the length, and angle are related in accordance with the formula:

$$\phi = \tan^{-1}(T/(\sigma_c * L * W)).$$

* * * * *